3,152,122
BACTERIOSTATIC COMPLEXES OF SILVER SALTS AND SUBSTITUTED TETRAHYDROPYRIMIDINE-2-THIONES AND HEXAHYDROPYRIMIDINE-2-THIONES

Edward Joseph Nikawitz, Glen Rock, N.J., assignor to The Givaudan Corporation, New York, N.Y., a corporation of New Jersey
No Drawing. Filed Aug. 29, 1961, Ser. No. 134,573
11 Claims. (Cl. 260—242)

This invention relates to novel bacteriostatic complexes of silver salts and substituted tetrahydropyrimidine-2-thiones and hexahydropyrimidine-2-thiones. More especially, this invention deals with complexes of an inorganic silver salt and an organic member selected from the group consisting of 4-hydroxy-4,6,6-trimethylhexahyropyrimidine-2-thione and 4,6,6-trimethyltetrahydropyrimidine-2-thione, or a mixture of said thiones.

The novel complexes of this invention have a surprising combination of properties. They are white, ordorless, active against Gram negative and Gram positive organisms and confer antiseptic properties to fabrics by a one-bath treatment. Said properties are retained, even after repeated laundering with a variety of commercial detergents; and the fabrics treated with the complexes of this invention discolor only very slightly when exposed to sunlight for many hours.

I am aware that certain silver compounds have been prepared and applied to fabrics in an attempt to confer antiseptic properties to them. Unsatisfactory results were obtained since the compounds discolored badly on the fabrics or washed out readily. In addition, I may mention that complexes of silver nitrate and 4,4,-dimethyl-1-isopropylimidazolidine-2-thione prepared by me exhibit good light stability on fabrics but they are not satisfactorily retained on fabrics after laundering. Even more striking, when one considers the present finding, is that the fact which I have found, that complexes of silver nitrate and hexahydropyrimidine-2-thione are quickly removed from fabrics by laundering.

The novel complexes of this invention contain from 1 to 3 moles of the aforesaid organic member to 1 mole of an inorganic silver salt. While the 1:1 and 1:2 complexes, based on silver salt to organic member, gives satisfactory results, the 1:3 complexes, on the same basis, have especially advantageous properties.

Among the silver salts which are useful in accordance with this invention are silver nitrate, silver chloride and silver bromide.

The complexes of this invention are prepared, in general, by adding silver chloride or silver bromide or an aqueous solution of silver nitrate to an agitated suspension of the aforesaid organic member in absolute alcohol, dilute alcohol, or a combination of dilute alcohol and p-dioxane, and continuing agitation within a range of about 20° C. to about 90° C., to effect solution. After filtration of the solution the resulting complexes are obtained in crystalline form either by allowing the filtrates to cool for about 20 hours at −10° C. or by partial evaporation of the solvent at about 25° C., followed by precipitation of the complexes by addition of ethyl ether. The crystalline complexes are filtered, washed with ice-cold water, aqueous alcohol or ethyl ether and then dried to constant weight at a pressure of about 4 mm. at about 25° C. to about 80° C., depending on the complex.

In using the novel complexes of this invention, solutions of the complexes in ethyl alcohol, dimethylformamide, propylene glycol or diethylene glycol monoethyl ether, diluted with water, may be applied to fabrics, followed by drying, e.g., at 25 to 30° C. for at least 20 hours.

If desired, the complexes may be formed by dissolving the silver salt in a solution of the correct amount of the organic member in a suitable solvent, and treating the fabrics with the resulting solution of the complexes, following by drying as before. The latter procedure eliminates the need to isolate the complex from the solution.

The concentrations of the solutions of the complexes may vary over wide limits. It has been found that solutions of the complexes from about 0.075% to about 1% by weight, based on the total solution, give satisfactory results, solutions from about 0.2% to about 0.5%, on the same basis, being especially desirable.

Relatively small amounts of the aforesaid complex silver salts are sufficient to impart the aforesaid desirable properties to textiles. Amounts as low as about 0.02 percent to about 2.0 percent of the total dry weight of the treated fabric have proved satisfactory. However, it is preferred to use amounts of the order of about 0.1 percent to about 0.5 percent, on the same basis. The upper limit of the amount employed is determined by practical considerations, etc. For this reason no practical advantageous results flow from the use of larger amounts, although larger amounts in general do enhance the antibacterial properties of the treated fabric.

The incorporation of the predetermined amount of the novel complexes onto textile fabric will depend on the method employed, as is well-known to those skilled in the art. For example, if the well-known technique referred to as padding is employed, under conditions such that the fabric picks up an amount of aqueous solution of complex equivalent to 75 percent by weight of the textile fabric itself, I have found that solutions from about 0.026 percent to about 2.6 percent in strength, i.e., by weight of silver complex based on the total solution, yield treated textile fabrics having about 0.02 percent to about 2.0 percent by weight of reaction product on the dry treated fabric. Similarly, following the same padding technique, aqueous solutions of about 0.13 percent to about 0.65 percent strength, on the aforesaid basis, yield treated fabrics having from about 0.1 percent to about 0.5 percent by weight on the dry treated fabric.

If desired, other methods known to the art may be used to incorporate the complexes on the fabric.

The method employed to test the treated fabrics for their antibacterial properties against Gram positive organisms is the agar plate method as given in Circular 198, December 1931, of the U.S. Food and Drug Administration.

To test for activity against Gram negative organisms and to test some practical applications of these fabrics, a modified urease test procedure was used. This method consisted of placing a 1 inch square of fabric on the bottom of a 4 oz. jar, saturating the fabric with urine, inoculating with *Phroteus vulgaris* and incubating the jars tightly capped at 37° C. A piece of pH indicator paper suspended from the jar cap was used as a visual means of detecting ammonia production due to bacterial action, and periodically the jars were opened and the presence of ammonia was determined organoleptically.

The laundry conditions employed involved the immersion of 5 gram samples of fabric in Erlenmeyer flasks containing 100 ml. of a 0.2 percent solution of a detergent or soap, e.g. "Fab" alkylaryl sulfonate powder (Colgate-Palmolive Co.) in water at 45° C., and agitating the flasks for 12 minutes on a rotary shaker (New Brunswick Scientific Co.). The laundered fabrics were first rinsed by agitating in 100 ml. of hot water (45° C.) three times and then were dried at 25° C. to 30° C. for at least 20 hours.

In order more fully to explain my invention, I give the following examples by way of illustration and not by way of limitation. The degrees are in centigrade and the concentrations of solvents, where given, in percentages by volume.

4 - hydroxy - 4,6,6 - trimethylhexahydropyrimidine - 2-thione has following structure:

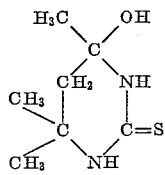

Under 4,6,6-trimethyltetrahydropyrimidine-2-thione, I understand a product or products obtained from 4-hydroxy-4,6,6-trimethylhexahydropyrimidine-2-thione by dehydration, i.e., splitting off one mole of water. It should be, however, understood, that 4,6,6-trimethyltetrahydropyrimidine-2-thione covers any product or products, obtained by other synthetic methods and having the same chemical and physical properties as the aforesaid dehydration product or products.

EXAMPLE 1

*4-Hydroxy,4,6,6-Trimethylhexahydropyrimidine-2-Thione*

Sodium (1 g.) was dissolved in a mixture of 10 g. of methanol and 50 g. of tert. butanol. The temperature rose to 65°. After cooling to 28°, 49 g. of pure mesityl oxide and 38 g. of pure thiourea were added to the agitated solution. The whole was agitated and heated in a water bath of a temperature of 50° for 5 minutes. The temperature of the reaction mixture rose to 54°. After the reaction period of 5 minutes, the formed heavy slurry was cooled to 28°. The solid was filtered, and washed with 50 ml. of methanol. It was then resludged with 100 ml. of methanol. The product was filtered, washed with 50 ml. of methanol and dried at room temperature for 4 days. Yield: 20.6 g. of white crystals; M.P.: about 226°.

ANALYSIS FOR $C_7H_{14}N_2OS$

|  | Calcd. | Found |
|---|---|---|
| Percent C | 48.24 | 45.97, 46.26 |
| Percent H | 8.09 | 7.89, 8.13 |
| Percent N | 16.07 | 16.6 |

Ten grams of the product were dissolved by refluxing for 30 seconds with 350 ml. of isopropanol. The filtered solution was cooled at once in an ice bath. It was allowed to crystallize for 20 hours at −10°. The compound was filtered, washed with 20 ml. of ice-cold isopropanol and dried to constant weight at a pressure of 4 mm. of mercury at room temperature. Yield: 6.7 g. of white crystals; M.P. 246–248°.

ANALYSIS FOR $C_7H_{14}N_2OS$

|  | Calcd. | Found |
|---|---|---|
| Percent C | 48.24 | 48.18 |
| Percent H | 8.09 | 8.22 |

EXAMPLE 2

*Complex of 1 Mole of Silver Nitrate With 3 Moles of 4 - Hydroxy - 4,6,6 - Trimethylhexahydropyrimidine-2-Thione*

The pure-4-hydroxy-,4,6,6-trimethylhexahydropyrimidine-2-thione (10.6 g.) obtained in accordance with Example 1 was suspended in an agitated mixture of 30 ml. of water and 27 ml. of denatured ethyl alcohol (S.D. alcohol #30). A solution of 3.4 g. of silver nitrate in 20 ml. of water was added and the whole was heated to 30°. The resulting solution was filtered into a flask being cooled in ice. The filtrate was allowed to crystallize for 3 hours at −10°. The crystals were filtered, washed with 30 ml. of ice-cold 50° alcohol and dried to constant weight at a pressure of 4 mm. at room temperature. Yield: 10.4 g. of white solid; M.P.: 171–172°.

ANALYSIS FOR $AgNO_3:3(C_7H_{14}N_2OS)$

|  | Calcd. | Found |
|---|---|---|
| Percent C | 36.41 | 36.68 |
| Percent H | 6.11 | 6.10 |
| Percent Ag | 15.58 | 15.6 |

EXAMPLE 3

*4-Hydroxy-4,6,6-Trimethylhexahydropyrimidine-2-Thione Technical*

Sodium methylate (17.6 g.) was dissolved in 300 g. of methanol. Mesityl oxide technical (150 g.) and thiourea technical (115 g.) were added to the agitated sodium methylate solution. The whole was then agitated and heated for 15 minutes at 50°. The formed brown solution was agitated and refluxed for 1 hour (temperature of the refluxing solution: 72°). A suspension of white crystals resulted which was allowed to stand at room temperature for 20 hours. The whole was then poured into 1,000 ml. of water. The mixture was agitated for 30 minutes. The crystals were filtered, washed three times with 100 ml. of ice-cold water, then with 100 ml. of ice-cold methanol and dried to constant weight at a pressure of 4 mm. at room temperature. Yield: 200 g.; M.P.: about 253°.

Analysis for $C_7H_{14}N_2OS$: Calcd.—N, 16.07%. Found: N, 16.52%, 16.74%.

The product consists of from 30% to 40% of 4,6,6-trimethyltetrahydropyrimidine-2-thione and about 70–60% of 4-hydroxy-4,6,6-trimethylhexahydropyrimidine-2-thione.

EXAMPLE 4

*Complex of 1 Mole of Silver Nitrate With 3 Moles of Technical 4-Hydroxy-4,6,6-Trimethylhexahydropyrimidine-2-Thione*

Technical 4-hydroxy - 4,6,6-trimethylhexahydropyrimidine-2-thione of Example 3 (105 g.), 300 ml. of water and 80 ml. S.D. alcohol #30 were agitated and heated at 50°. A suspension formed.

A solution of 34 g. of silver nitrate in 100 ml. of water was poured into the suspension. The whole was agitated and refluxed for 2 minutes. The resulting, slightly-cloudy solution was filtered from a trace of an insoluble product. The filtrate was allowed to cool to about 50°. Some oil droplets appeared which were converted to crystals by seeding with the desired complex compound. After standing for 20 hours in the refrigerator, the white crystals were filtered, washed with 50 ml. of ice-cold water and dried to constant weight at a pressure of 4 mm. at room temperature. Yield: 128.6 g.; M.P.: 161–163°, after sintering.

ANALYSIS FOR $AgNO_3:3(C_7H_{14}N_2OS)$

|  | Calcd. | Found |
|---|---|---|
| Percent C | 36.41 | 36.59 |
| Percent H | 6.11 | 6.41 |
| Percent Ag | 15.58 | 15.60 |

EXAMPLE 5

*4,6,6-Trimethyltetrahydropyrimidine-2-Thione*

Technical 4-hydroxy - 4,6,6-trimethylhexahydropyrimidine-2-thione of Example 3 (57.5 g.) and 1,500 ml. of dry xylene were agitated and refluxed for 20 hours, the formed water (4.2 ml.) being removed azeotropically. After cooling to room temperature, the batch was cooled for 3 hours at −10°. The solid was filtered and washed with 50 ml. of ice-cold xylene. It was dried for 2 days at room temperature. Yield: 49.7 g. of slightly yellowish crystals. The product was dissolved in 1,600 ml.

of refluxing isopropanol. The filtered solution was allowed to crystallize for 20 hours at −10°. The white crystals were filtered, washed with 50 ml. of ice-cold isopropanol and dried to constant weight at a pressure of 4 mm. at room temperature. Yield: 43.4 g.; M.P.: about 251–252°.

ANALYSIS FOR $C_7H_{12}N_2S$

|  | Calcd. | Found |
|---|---|---|
| Percent C | 53.80 | 53.71 |
| Percent H | 7.74 | 7.74 |
| Percent N | 17.93 | 18.21 |

EXAMPLE 6

*Complex of 1 Mole of Silver Nitrate With 3 Moles of 4,6,6-Trimethyltetrahydropyrimidine-2-Thione*

The product of Example 5 (4,6,6-trimethyltetrahydropyrimidine-2-thione, 23.6 g.) was suspended in a mixture of 70 ml. of water and 43 ml. of S.D. alcohol #30. A solution of 8.5 g. of silver nitrate in 30 ml. of water was added to the agitated suspension at 50°. The whole was then refluxed for one minute. The resulting solution was filtered. The filtrate was allowed to crystallize for 20 hours in the refrigerator. The white crystals were filtered, washed with 25 ml. of an ice-cold mixture of S.D. alcohol #30 and water (ratio 43:100) and finally with 30 ml. of ice-cold water. They were dried to constant weight at a pressure of 4 mm. at room temperature. Yield: 29.2 g.; M.P.: 143–146°.

ANALYSIS FOR $AgNO_3:3(C_7H_{12}N_2S)$

|  | Calcd. | Found |
|---|---|---|
| Percent C | 39.49 | 39.43 |
| Percent H | 5.68 | 5.93 |
| Percent Ag | 16.89 | 16.80 |

EXAMPLE 7

*Complex of 1 Mole of Silver Nitrate With 1 Mole of Technical 4-Hydroxy-4,6,6-Trimethylhexahydropyrimidine-2-Thione*

Technical 4 - hydroxy-4,6,6-trimethylhexahydropyrimidine-2-thione (34.8 g.) of Example 3 was suspended in 120 ml. of water. A solution of 33.9 g. of silver nitrate in 50 ml. of water was added to the agitated suspension at 90°. The thione did not go into solution. S.D. alcohol #30 (80 ml.) was added and the whole was refluxed for 6 minutes (temperature of the refluxing solution 85°). Some of the thione remained undissolved. An additional amount of 20 ml. of S.D. alcohol #30 brought about nearly complete solution. The grayish solution was refluxed for 3 minutes with 2 g. of Darco decolorizing carbon. The solution was filtered from the Darco into a precooled flask. The filter was washed with 20 ml. of hot S.D. Alcohol #30. An oil, contaminated with traces of Darco, precipitated in the filtrate. After addition of 20 ml. of S.D. alcohol #30, the oil was redissolved by refluxing the mixture for 10 minutes. The solution was filtered. The filtrate was allowed to cool off slowly. A white, crystalline precipitate formed. After standing for 20 hours in the refrigerator, the product was filtered and washed with an ice-cold mixture of 10 ml. of S.D. alcohol #30 and 12 ml. of water. It was dried to constant weight at a pressure of 4 mm. at room temperature. Yield: 48 g.; M.P.: 167°, decomposition.

Analysis for $AgNO_3:C_7H_{14}N_2OS$: Calcd.—Ag, 31.34%. Found: Ag 32.8%.

The mother liquor was concentrated to half of its original volume by distillation at a pressure of 30 mm. from a water bath kept at a temperature of 70–80°. The resulting gray suspension was refluxed for 5 minutes with 2 g. of Darco. The solution was filtered from the Darco. The filtrate was allowed to crystallize for 20 hours in the refrigerator. The crystals were filtered and washed with 10 ml. of ice-cold 50% alcohol. They were dried to constant weight at a pressure of 4 mm. at room temperature. Yield: 4.3 g.; M.P.: 164–166°. Percent Ag found: 31.6.

EXAMPLE 8

*Complex of 1 Mole of Silver Nitrate With 2 Moles of Technical 4 - Hydroxy-4,6,6-Trimethylhexahydropyrimidine-2-Thione*

Technical 4 - hydroxy-4,6,6-trimethylhexahydropyrimidine-2-thione (35 g.) of Example 3 was suspended in 100 ml. of water. A solution of 17 g. of silver nitrate in 50 ml. of water was added to the agitated suspension at 85°. The whole was then agitated for 5 minutes at 90°. A mushy product formed. S.D. alcohol #30 (125 ml.) was added. After refluxing for one minute, a grayish solution resulted. It was filtered and a slight amount of an insoluble material was obtained. The filtrate was allowed to crystallize for 20 hours in the refrigerator. The slightly tan colored crystals were filtered and washed with an ice-cold mixture of 15 ml. of water and 12 ml. of S.D. alcohol #30. They were dried to constant weight at a pressure of 4 mm. at room temperature. Yield: 19.4 g.; M.P.: 223–226°.

Analysis for $AgNO_3:2(C_7H_{14}N_2OS)$: Calcd.—Ag, 20.8%. Found: Ag, 19.4%.

The mother liquor was allowed to stand for 48 hours in the refrigerator. The newly formed crystals were filtered, washed with 10 ml. of water, and dried to constant weight at a pressure of 4 mm. at room temperature. Yield: 19.6 g. Melting points within a range of 148.5 to 168° were obtained.

Analysis for $AgNO_3:2(C_7H_{14}N_2OS)$: Calcd.—Ag, 20.8%. Found: Ag, 20.4%.

EXAMPLE 9

*Complex of 1 Mole of Silver Chloride With 3 Moles of Technical 4-Hydroxy-4,6,6-Trimethylhexahydropyrimidine-2-Thione*

Technical 4 - hydroxy - 4,6,6 - trimethylhexahydropyrimidine-2-thione (52.3 g.) of Example 3 was agitated with a mixture of 100 ml. of water, 230 ml. of S.D. alcohol #30 and 50 ml. of p-dioxane. Silver chloride (14.3 g.), freshly prepared from 16.9 of silver nitrate and 6 g. of sodium chloride, was added. On refluxing, a slightly brownish solution resulted. The whole was refluxed for 6 minutes with 2 g. of Nuchar decolorizing carbon. The solution was filtered from the Nuchar and allowed to crystallize for 3 days at −10°. The formed crystals were filtered and washed twice with 20 ml. amounts of 50% alcohol. The white crystals were dried to constant weight at a pressure of 4 mm. at room temperature. Yield: 43.9 g.; M.P.: 220–222°.

Analysis for $AgCl:3(C_7H_{14}N_2OS)$: Calcd.—Ag, 16.19%. Found: Ag, 17.40%.

EXAMPLE 10

*Complex of 1 Mole of Silver Bromide With 3 Moles of Technical 4-Hydroxy-4,6,6-Trimethylhexahydropyrimidine-2-Thione*

Technical 4 - hydroxy - 4,6,6 - trimethylhexahydropyrimidine-2-thione (52.3 g.) of Example 3 was agitated with a mixture of 125 ml. of water, 205 ml. of S.D. alcohol #30 and 110 ml. of p-dioxane. Silver bromide (18.8 g.), freshly prepared from 16.9 g. of silver nitrate and 10.3 g. of sodium bromide, was added. The whole was refluxed for 10 minutes in the presence of 3 g. of Nuchar. The solution was filtered from the Nuchar and allowed to crystallize for 2 days at −10°. The formed crystals were filtered, washed with 50 ml. of ice-cold 50% alcohol and then with 50 ml. of water. The white crystals were dried to constant weight at a pressure of 4 mm. at room temperature. Yield: 57.6 g.; M.P.: softens at 163°.

Analysis for AgBr:(3$C_7H_{14}N_2OS$): Calcd.—Ag, 15.18%. Found: Ag, 15.4%.

EXAMPLE 11

*Complex of 1 Mole of Silver Chloride with 2 Moles of Technical 4-Hydroxy-4,6,6-Trimethylhexahydropyrimidine-2-Thione*

Technical 4 - hydroxy - 4,6,6 - trimethylhexahydropyrimidine-2-thione (34.9 g.) of Example 3 was agitated with a mixture of 250 ml. of 50% alcohol and 50 ml. of p-dioxane. Silver chloride (14.3 g.), freshly prepared from 16.9 g. of silver nitrate and 6 g. of sodium chloride, was added. The whole was agitated and refluxed for 10 minutes. A very small amount of silver chloride remained undissolved. After refluxing for 10 minutes with 3 g. of Nuchar the solution was filtered into a precooled flask. The filtrate was allowed to crystallize for 3 hours at 0°. The formed solid was filtered and washed three times with 20 ml. amounts of 50% alcohol. The white solid was dried to constant weight at a pressure of 4 mm. at room temperature. Yield: 22.1 g.; M.P.: softens at 108°; decomposes at 145–146°.

ANALYSIS FOR AgCl: 2($C_7H_{14}N_2OS$)

|  | Calcd. | Found |
| --- | --- | --- |
| Percent C | 34.18 | 35.42 |
| Percent H | 5.73 | 5.71 |
| Percent Ag | 21.93 | 24.30 |

EXAMPLE 12

*Complex of 1 Mole of Silver Bromide With 2 Moles of Technical 4-Hydroxy-4,6,6-Trimethylhexahydropyrimidine-2-Thione*

Technical 4 - hydroxy - 4,6,6 - trimethylhexahydropyrimidine-2-thione (34.9 g.) of Example 3 was agitated with a combination of 250 ml. of 50% alcohol, 80 ml. of S.D. alcohol #30 and 130 ml. of p-dioxane. Silver bromide (18.8 g.), freshly prepared from 16.9 g. of silver nitrate and 10.3 g. of sodium bromide, was added. The whole was agitated and refluxed for 5 minutes. An olive-gray turbid solution resulted. After refluxing for 10 minutes in the presence of 3 g. of Nuchar, the solution was filtered into a precooled flask. The filtrate was allowed to crystallize for 3 hours at 0°. The crystals were filtered and washed twice with 30 ml. amounts of ice-cold 50% alcohol. The solid was dried to constant weight at a pressure of 4 mm. at room temperature. Yield: 36.5 g.; M.P.: softens at 148°; decomposes at 150–153°.

Analysis for AgBr:2($C_7H_{14}N_2OS$): Calcd.—Ag, 20.11%. Found: Ag, 21.23%.

EXAMPLE 13

*Complex of 1 Mole of Silver Chloride With 3 Moles of 4-Hydroxy-4,6,6-Trimethylhexahydropyrimidine-2-Thione*

Pure 4 - hydroxy - 4,6,6 - trimethylhexahydropyrimidine - 2 - thione (10.5 g.) and silver chloride (2.9 g.), freshly prepared from 3.4 g. of silver nitrate and 1.2 g. of sodium chloride, were agitated with 85 ml. of anhydrous S.D. alcohol #30 at 24° for 2 hours. The formed solution was filtered from a trace of undissolved silver chloride. The filtrate was concentrated to dryness by spontaneous evaporation of the alcohol. The half-solid residue was dissolved in 60 ml. of S.D. alcohol #30 at room temperature. The solution was filtered. Ethyl ether (250 ml.) was added and the whole was allowed to crystallize for 20 hours at −10°. The formed white crystals were filtered and washed with 20 ml. of ethyl ether. The crystals were dried for 8 hours at a pressure of 4 mm. at room temperature. Yield: 11.3 g.; M.P.: 118°, decomposition. The crystals had a slight odor of ether. Analysis indicates that the product contains 1 mole of ethyl ether.

ANALYSIS FOR AgCl: 3($C_7H_{14}N_2OS$)

|  | Calcd. | Found |
| --- | --- | --- |
| Percent C | 37.86 | 41.36 |
| Percent H | 6.35 | 7.23 |
| Percent Ag | 16.19 | 15.28 |

ANALYSIS FOR AgCl: 3($C_7H_{14}N_2OS$).($C_2H_5$)$_2$O

|  | Calcd. | Found |
| --- | --- | --- |
| Percent C | 40.56 | 41.36 |
| Percent H | 7.08 | 7.22 |
| Percent Ag | 14.57 | 15.83 |

EXAMPLE 14

*Complex of 1 Mole of Silver Chloride With 3 Moles of 4,6,6-Trimethyltetrahydropyrimidine-2-Thione*

Pure 4,6,6-trimethyltetrahydropyrimidine - 2 - thione (23.5 g.) and silver chloride (7.1 g.), freshly prepared from 8.5 g. of silver nitrate and 3 g. of sodium chloride, were agitated and refluxed for 5 minutes with a mixture of 50 ml. of water, 120 ml. of S.D. alcohol #30 and 120 ml. of p-dioxane. The resulting solution was filtered. The filtrate was allowed to crystallize at −10° for 20 hours. The formed white crystals were filtered and washed with 30 ml. of ice-cold 50% alcohol. They were dried to constant weight at a pressure of 4 mm. at 80°. Yield: 18.17 g.; M.P. 222–224°.

ANALYSIS FOR AgCl: 3($C_7H_{12}N_2S$)

|  | Calcd. | Found |
| --- | --- | --- |
| Percent C | 41.20 | 41.52 |
| Percent H | 5.92 | 6.12 |
| Percent Ag | 17.62 | 17.59 |

EXAMPLE 15

*Complex of 1 Mole of Silver Bromide With 3 Moles of 4 - Hydroxy - 4,6,6 - Trimethylhexahydropyrimidine-2-Thione*

Pure 4-hydroxy-4,6,6-trimethylhexahydropyrimidine-2-thione (10.5 g.) and silver bromide (3.75 g), freshly prepared from 3.4 g. of silver nitrate and 2.1 g. of sodium bromide, were agitated with 80 ml. of anhydrous S.D. alcohol #30 at 24° for 2 hours. The solution was filtered from 0.4 g. of an insoluble material. The filtrate was concentrated to dryness by spontaneous evaporation of the alcohol. The half-solid residue was dissolved in 80 ml. of anhydrous S.D. alcohol #30. The solution was filtered from a trace of an insoluble material. Ethyl ether (400 ml.) was added to the filtrate and the whole was allowed to crystallize for 20 hours at −10°. The formed white crystals were filtered and washed with 20 ml. of ethyl ether. The crystals were dried for 8 hours at a pressure of 4 mm. at room temperature. Yield: 9.6 g.; M.P.: 117° decomposition. The crystals had a slight odor of ether. Analysis indicates that the product contains 1 mole of ethyl ether.

ANALYSIS FOR AgBr: 3($C_7H_{14}N_2OS$)

|  | Calcd. | Found |
| --- | --- | --- |
| Percent C | 35.49 | 38.53 |
| Percent H | 5.95 | 6.69 |
| Percent Ag | 15.18 | 14.40 |

Analysis for AgBr: 3($C_7H_{14}N_2OS$).($C_2H_5$)$_2$O

|  | Calcd. | Found |
| --- | --- | --- |
| Percent C | 38.26 | 38.53 |
| Percent H | 6.67 | 6.69 |
| Percent Ag | 13.74 | 14.40 |

EXAMPLE 16

*Complex of 1 Mole of Silver Bromide With 3 Moles of 4,6,6-Trimethyltetrahydropyrimidine-2-Thione*

Pure 4,6,6-trimethyltetrahydropyrimidine - 2 - thione (23.5 g.) and silver bromide (9.4 g.), freshly prepared from 8.5 g. of silver nitrate and 5.3 g. of sodium bromide, were agitated and refluxed for 15 minutes with a mixture of 60 ml. of water, 100 ml. of S.D. alcohol #30 and 140 ml. of p-dioxane. The resulting solution was filtered. The filtrate was allowed to crystallize at −10° for 20 hours. The formed white crystals were filtered and washed with 50 ml. of ice-cold 50% alcohol. They were dried to constant weight at a pressure of 4 mm. at 80°. Yield: 23.4 g.; M.P.: 213–215°.

ANALYSIS FOR AgBr: $3(C_7H_{12}N_2S)$

|  | Calcd. | Found |
| --- | --- | --- |
| Percent C | 38.41 | 38.48 |
| Percent H | 5.52 | 5.85 |
| Percent Ag | 16.43 | 16.72 |

EXAMPLE 17

*Complex of 1 Mole of Silver Chloride With 2 Moles of 4,6,6-Trimethyltetrahydropyrimidine-2-Thione*

Pure 4,6,6-trimethyltetrahydropyrimidine - 2 - thione (15.6 g.) and silver chloride (7.1 g.), freshly prepared from 8.5 g. of silver nitrate and 3 g. sodium chloride, were agitated and refluxed for 10 minutes with a mixture of 125 ml. of 50% alcohol and 80 ml. of p-dioxane. The resulting solution was filtered. The filtrate was allowed to crystallize at −10° for 50 hours. The formed crystals were filtered and washed twice with 25 ml. of ice-cold 50% alcohol. They were dried to constant weight at a pressure of 4 mm. at 80°. Yield: 15.6 g.; M.P.: forms a cloudy melt at 193–195°. A clear melt forms at 214–216°.

ANALYSIS FOR AgCl: $2(C_7H_{12}N_2S)$

|  | Calcd. | Found |
| --- | --- | --- |
| Percent C | 36.88 | 37.20 |
| Percent H | 6.19 | 5.87 |
| Percent Ag | 23.60 | 23.00 |

EXAMPLE 18

*Complex of 1 Mole of Silver Chloride With 2 Moles Pure 4 - Hydroxy - 4,6,6 - Trimethylhexahydropyrimidine-2-Thione*

Pure 4-hydroxy-4,6,6-trimethylhexahydropyrimidine-2-thione (7 g.) and silver chloride (2.9 g.), freshly prepared from 3.4 g. of silver nitrate and 1.3 g. of sodium chloride, were agitated with 40 ml. of anhydrous S.D. alcohol #30 for 5 hours. The nearly clear solution was filtered. Ethyl ether (250 ml.) was added to the filtrate. The whole was allowed to crystallize at −10° for 48 hours. The formed crystals were filtered and washed with 25 ml. of ethyl ether. They were dried for 8 hours at a pressure of 4 mm. at room temperature. Yield: 8.5 g.; M.P.: 120°, decomposition. The crystals had a slight odor of ether. Analysis indicates that the compound contains 1 mole of ethyl ether.

ANALYSIS FOR AgCl: $2(C_7H_{14}N_2OS).(C_2H_5)_2O$

|  | Calcd. | Found |
| --- | --- | --- |
| Percent C | 38.19 | 38.14 |
| Percent H | 6.80 | 6.42 |
| Percent Ag | 19.06 | 20.27 |

EXAMPLE 19

*Complex of 1 Mole of Silver Bromide With 2 Moles of Pure 4 - Hydroxy-4,6,6-Trimethylhexahydropyrimidine-2-Thione*

Pure 4-hydroxy-4,6,6-trimethylhexahydropyrimidine-2-thione (7 g.) and silver bromide (3.75 g.), freshly prepared from 3.4 g. of silver nitrate and 2.1 g. of sodium bromide, were agitated with 60 ml. of anhydrous S.D. alcohol #30 at 24° for 5 hours. The nearly clear solution was filtered. The filtrate was concentrated to 40 ml. by partial spontaneous evaporation of the alcohol. The concentrate was filtered. Ethyl ether (400 ml.) was added to the filtrate. The whole was allowed to crystallize at −10° for 20 hours. The formed white crystals were filtered, washed with 25 ml. of ethyl ether and dried to constant weight at a pressure of 4 mm. at room temperature. Yield: 8.6 g.; M.P.: 105°, decomposition at 115°. The crystals had a slight odor of ether. Anaylsis indicates that the compound contains 1 mole of ethyl ether.

ANALYSIS FOR AgBr: $2(C_7H_{14}N_2OS).(C_2H_5)_2O$

|  | Calcd. | Found |
| --- | --- | --- |
| Percent C | 35.40 | 34.85 |
| Percent H | 6.30 | 6.21 |
| Percent Ag | 17.67 | 17.52 |

EXAMPLE 20

The complex prepared in accordance with Example 2 was assayed for bacteriostatic activity by a two-fold dilution serial technique in A.O.A.C. (Association of Official Agricultural Chemists) agar (molten) tubes. The contents were poured into sterile Petri plates and streaked with 24 hours A.O.A.C. broth cultures of the test organisms noted below. The minimal inhibitory concentrations of the complex were as follows:

| Test organism: | Parts per million |
| --- | --- |
| Staphylococcus aureus | 32 |
| Escherichia coli | 250 |
| Pseudomonas aeruginosa | 64 |
| Proteus vulgaris | 32 |

Samples of cotton sheeting were treated with various concentrations of the complex, subjected to multiple laundering cycles in 0.2% Fab, and tested for antibacterial activity in zone of inhibition tests with *S. aureus*. The results are given below:

ZONES OF INHIBITION (MM.)

| Percent in Fabric | Number of Launderings | | | | |
| --- | --- | --- | --- | --- | --- |
|  | 15 | 20 | 25 | 35 | 45 |
| 0.25 | 2.0 | 1.0 | 1.0 | 1.0 | 1.0 |
| 0.50 | 4.0 | 3.0 | 3.0 | 2.5 | 1.8 |
| 1.00 | 5.0 | 5.0 | 4.0 | 3.0 | 3.0 |

The fabrics treated in accordance with this example showed no discoloration before and after laundering. However, there was discoloration to slight cream-white when the treated fabrics were exposed more than 4 hours in direct sunlight following 3 launderings.

No ammonia production was observed when the treated samples, after being laundered 3 times, and exposed on the roof in New Jersey for 6 days, were placed in capped jars, saturated with urine, inoculated with *Proteus vulgaris*, and incubated at 35° C. for 24 hours. Control samples produced a significant quantity of ammonia within 3 hours.

This foregoing ammonia test demonstrates the activity of the complex against Gram negative ammonia-producing organisms and indicates the practical benefits which can be derived from applications to fabrics such as diapers.

The foregoing tests for bacteriostatic activity, laundering resistance, and inhibition of ammonia-producing organisms set forth in the present example, were also applied to the other complexes made in accordance with the foregoing examples. Substantially the same results as those obtained with the complex of Example 2 were obtained with said other complexes.

It is understood that wherever the context of the specification or claims so admits or requires, the molar ratios of the components of the complexes include those ratios which are substantially those specified.

The foregoing illustrates the practice of this invention, which, however, is not to be limited thereby, but is to be construed as broadly as permissible in view of the prior art and limited solely by the appended claims.

I claim:

1. A complex of an inorganic silver salt and at least one organic member selected from the group consisting of 4,6,6-trimethyltetrahydropyrimidine-2-thione and 4-hydroxy-4,6,6-trimethylhexahydropyrimidine-2-thione.

2. A complex as in claim 1, wherein the silver salt is selected from the group consisting of silver nitrate, silver chloride and silver bromide, and the ratio of the organic member to silver salt is from 1 to 3 moles of the former to 1 mole of the latter.

3. A complex of 1 mole of silver nitrate and 3 moles of 4-hydroxy-4,6,6-trimethylhexahydropyrimidine-2-thione.

4. A complex of 1 mole of silver chloride and 3 moles of 4-hydroxy-4,6,6-trimethylhexahydropyrimidine-2-thione.

5. A complex of 1 mole of silver bromide and 3 moles of 4-hydroxy-4,6,6-trimethylhexahydropyrimidine-2-thione.

6. A complex of 1 mole of silver nitrate and 3 moles of a mixture consisting from about 10 to 90 percent of 4,6,6-trimethyltetrahydropyrimidine-2-thione and 90 to 10 percent of 4-hydroxy-4,6,6-trimethylhexahydropyrimidine-2-thione.

7. A complex of 1 mole of silver chloride and 3 moles of a mixture consisting of from about 10 to 90 percent of 4,6,6-trimethyltetrahydropyrimidine-2-thione and 90 to 10 percent of 4-hydroxy-4,6,6-trimethylhexahydropyrimidine-2-thione.

8. A complex of 1 mole of silver bromide and 3 moles of a mixture consisting of from about 10 to 90 percent of 4,6,6-trimethyltetrahydropyrimidine-2-thione and 90 to 10 percent of 4-hydroxy-4,6,6-trimethylhexahydropyrimidine-2-thione.

9. A complex of 1 mole of silver nitrate and 3 moles of 4,6,6-trimethyltetrahydropyrimidine-2-thione.

10. A complex of 1 mole of silver chloride and 3 moles of 4,6,6-trimethyltetrahydropyrimidine-2-thione.

11. A complex of 1 mole of silver bromide and 3 moles of 4,6,6-trimethyltetrahydropyrimidine-2-thione.

References Cited in the file of this patent

UNITED STATES PATENTS

| | | |
|---|---|---|
| 2,473,802 | Kuh et al. | June 21, 1949 |
| 2,803,626 | Ainley | Aug. 20, 1957 |
| 2,841,529 | Schmidt et al. | July 1, 1958 |
| 2,890,150 | Baldwin | June 9, 1959 |
| 2,992,270 | Dunn | July 11, 1961 |
| 3,004,895 | Schwartz | Oct. 17, 1961 |

FOREIGN PATENTS

| | | |
|---|---|---|
| 1,065,849 | Germany | Sept. 24, 1959 |

OTHER REFERENCES

Noller: "Chemistry of Organic Compounds," 2nd Ed., p. 277 (Saunders) (1957).

Pyrimidines, vol. 16 of the Interscience series "Heterocyclic Compounds, p. 277 (Interscience) (1962).

UNITED STATES PATENT OFFICE
CERTIFICATE OF CORRECTION

Patent No. 3,152,132

October 6, 1964

Edward Joseph Nikawitz

It is hereby certified that error appears in the above numbered patent requiring correction and that the said Letters Patent should read as corrected below.

Column 1, lines 16 and 17, for "-trimethylhexahyropyrimidine" read -- trimethylhexahydropyrimidine --; line 37, strike out "that"; column 2, line 4, for "complexes" read -- complex --; line 55, for "Phroteus", in italics, read -- Proteus --, in italics; column 3, line 4, after "has" insert -- the --; line 75 for "50°" read -- 50% --; column 8, lines 1 to 15, bottom portion of the table, last column, line 2 thereof, for "7.22" read -- 7.23 --; same table, same column, line 3 thereof, for "15.83" read -- 15.28 --; same column 8, line 30, for "18.17 g." read -- 18.7 g. --.

Signed and sealed this 16th day of February 1965.

(SEAL)
Attest:

ERNEST W. SWIDER
Attesting Officer

EDWARD J. BRENNER
Commissioner of Patents